(12) United States Patent
Boals

(10) Patent No.: US 8,960,916 B2
(45) Date of Patent: Feb. 24, 2015

(54) PROJECTION ADVERTISING GLASSWARE

(71) Applicant: Timothy R Boals, Sandusky, OH (US)

(72) Inventor: Timothy R Boals, Sandusky, OH (US)

(*) Notice: Subject to any disclaimer, the term of this patent is extended or adjusted under 35 U.S.C. 154(b) by 226 days.

(21) Appl. No.: 13/733,817

(22) Filed: Jan. 3, 2013

(65) Prior Publication Data

US 2014/0185019 A1   Jul. 3, 2014

(51) Int. Cl.
| | |
|---|---|
| *G03B 21/00* | (2006.01) |
| *G03B 29/00* | (2006.01) |
| *G09F 13/04* | (2006.01) |
| *H04N 9/31* | (2006.01) |
| *G06Q 30/02* | (2012.01) |
| *G09F 23/00* | (2006.01) |

(52) U.S. Cl.
CPC .............. *G03B 29/00* (2013.01); *G03B 21/00* (2013.01); *G09F 2013/0463* (2013.01); *G09F 2013/0477* (2013.01); *H04N 9/3173* (2013.01); *G06Q 30/0251* (2013.01); *G09F 2023/0025* (2013.01)
USPC ............. 353/28; 353/38; 353/122; 705/14.49

(58) Field of Classification Search
CPC ...... G03B 21/00; G03B 21/14; G03B 21/145; G03B 21/54; G03B 29/00; H04N 9/31; H04N 9/3155; H04N 9/3173; H04N 9/3179; H04N 9/3197; H04N 5/2723; G06Q 30/0241; G06Q 30/0251; G09F 13/00; G09F 13/005; G09F 13/0413; G09F 2013/0418; G09F 2013/0463; G09F 2013/0477; G09F 2023/0025; G09F 2023/0033; G09F 23/0091; G09F 23/02; G09F 23/04
USPC .............. 353/28, 31, 36, 39, 43, 72, 85, 119, 353/122; 705/14.4, 14.49, 14.5; 725/42; D20/19, 23–24, 29–30
See application file for complete search history.

(56) References Cited

U.S. PATENT DOCUMENTS

| | | | | |
|---|---|---|---|---|
| 1,711,469 | A * | 4/1929 | Stratford | 215/230 |
| 2,970,715 | A * | 2/1961 | Kappel et al. | 220/516 |
| 4,263,734 | A * | 4/1981 | Bradshaw | 40/324 |
| 4,309,784 | A * | 1/1982 | Cohen | 5/639 |
| 7,383,650 | B2 * | 6/2008 | Duesler | 40/310 |
| 7,465,058 | B1 * | 12/2008 | Lopez | 362/154 |
| 7,613,431 | B2 * | 11/2009 | Brand | 455/90.3 |
| 8,009,359 | B2 * | 8/2011 | McCannel et al. | 359/619 |
| 8,272,545 | B1 * | 9/2012 | Saffran | 224/148.4 |
| 8,350,679 | B2 * | 1/2013 | Wen et al. | 340/309.16 |
| 2005/0024858 | A1 * | 2/2005 | Johnson | 362/154 |
| 2007/0204495 | A1 * | 9/2007 | Lee | 40/324 |
| 2013/0155715 | A1 * | 6/2013 | Kim et al. | 362/553 |
| 2013/0227481 | A1 * | 8/2013 | Keys et al. | 715/810 |
| 2014/0146289 | A1 * | 5/2014 | Biernath et al. | 353/28 |
| 2014/0188502 | A1 * | 7/2014 | Defrank et al. | 705/2 |

* cited by examiner

*Primary Examiner* — Tony Ko
*Assistant Examiner* — Jori S Reilly-Diakun
(74) *Attorney, Agent, or Firm* — Oakwood Law Group, LLP; Stephen Liu

(57) ABSTRACT

A method and system of advertising that involves projection of a logo or advertisement from a drinking glass. The logo or advertisement projecting glassware has a light source that projects the inserted film when the glass is lifted, and wherein the projection is turned off when the glassware is placed on a solid surface.

13 Claims, 6 Drawing Sheets

PROJECTION ADVERTISING GLASSWARE

BACKGROUND OF THE INVENTION

1. Field of the Invention

The present invention relates generally to a method and system of advertising, and more particularly to a method and system of advertising that involves projection of advertisement from illumination equipment that is installed on the bottom of drinking glassware.

2. Description of Related Art

In the past a company could only print their logo directly on the item. Advancement in technology has enabled the advertisement industry to switch from the static and permanent product images directly printed on a piece of item or board to the dynamic electronic product images projected onto a piece of item or board for advertisement. Illumination technology has been widely used in many areas for entertaining and advertising purpose. One advantage of using illumination technology is that the advertisement content can be easily switched than the printed content and thus advertisement using illumination technology is more diversified, flexible and can be more affordable.

Therefore, it would be desirable to have a different advertising method and system for choice.

SUMMARY OF THE INVENTION

One object of the present invention is to provide an additional advertising method and system.

Another object of the present invention is to provide an innovative way of displaying electronic logo in a dark environment.

Yet another object of the present invention is to provide an advertisement system that allows easy switching of advertisement content.

Yet another object of the present invention is to provide an advertisement system that is low cost.

The light up glass of the present invention provides a new way to display electronic logs or advertisement through drinking glassware. It provides an innovative way of displaying electronic logos or advertisement in a dark environment using illumination equipment installed on the bottom of drinking glassware rather than a standard logo printed on a glass that is hard to see in a dark environment like a bar. Unlike a typical advertisement that a logo is permanently printed on a glass, the light up glass of the present invention can be used to do advertisement for different merchants using the same glassware because the advertisement content can be easily switched by replacing the logo/advertisement film member. This advertisement system is low in cost.

The light can be automatically turned off when the drinking glassware is put on the table to save energy. Beside for advertisement, the glassware can be used to send personal message such as greeting for happy birthday, etc.

The light up glass in accordance with the present invention are acrylic glass, pilsner, shot or shotter and are installed a light in the base that projects a logo on a flat surface when the light up glass piece is picked up. There is a switch on the bottom that is activated when the glass is picked up.

The light up glass of the present invention comprises at least one light source, at least one power source, at least one logo or advertisement film member which contains logo or advertisement information, and at least one housing to enclose these components. The housing including the foregoing components is attached to the bottom of typical drinking glassware. Any light source suited for the intended purpose will suffice, such as, but not limited to light-emitting diodes (LED's), fiber optics, halogen, incandescent, laser, fluorescent, magnetic, and the like. The light up glass further comprises a pressure sensitive switch connected between the power source and light source to control on/off of the light source. The pressure sensitive switch is triggered by the weight of the glassware. When the glassware is put on the table, the switch is triggered to turn off the light source; when the glassware is picked up, the switch is triggered to turn on the light source. Then the light shines through the logo/advertisement film membrane and projects onto a solid surface including but not limited to a table surface.

Before explaining at least one embodiment of the invention in detail, it is to be understood that the invention is not limited in its application to the details of construction and the arrangements of the components set forth in the following description or illustrated in the drawings. The invention is capable of other embodiments and of being practiced and carried out in various ways. Also it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features, and advantages of the present invention will become more fully apparent from the following detailed description, the appended claim, and the accompanying drawings in which similar elements are given similar reference numerals.

DESCRIPTION OF THE PREFERRED EMBODIMENT

Figure 1:
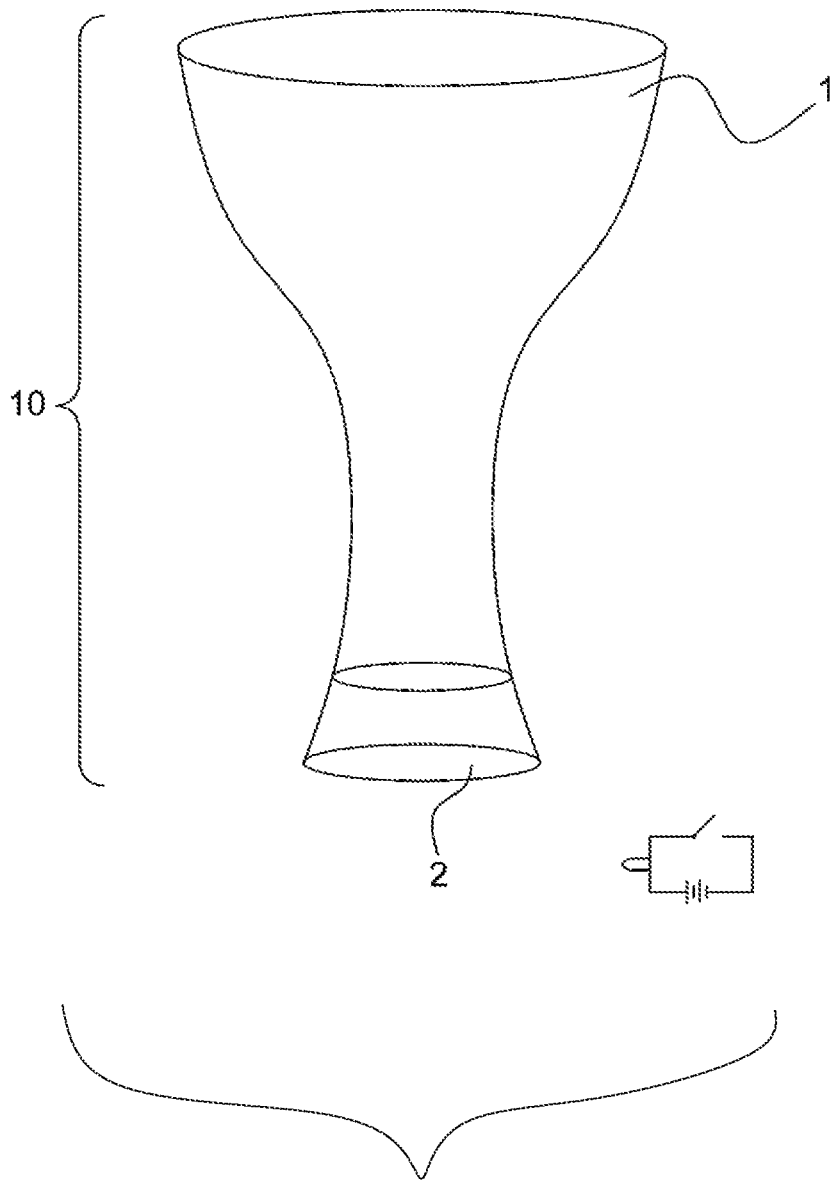
FIG. 1 is a perspective view of the light up glass in accordance with an embodiment of the present invention.
Figure 2:
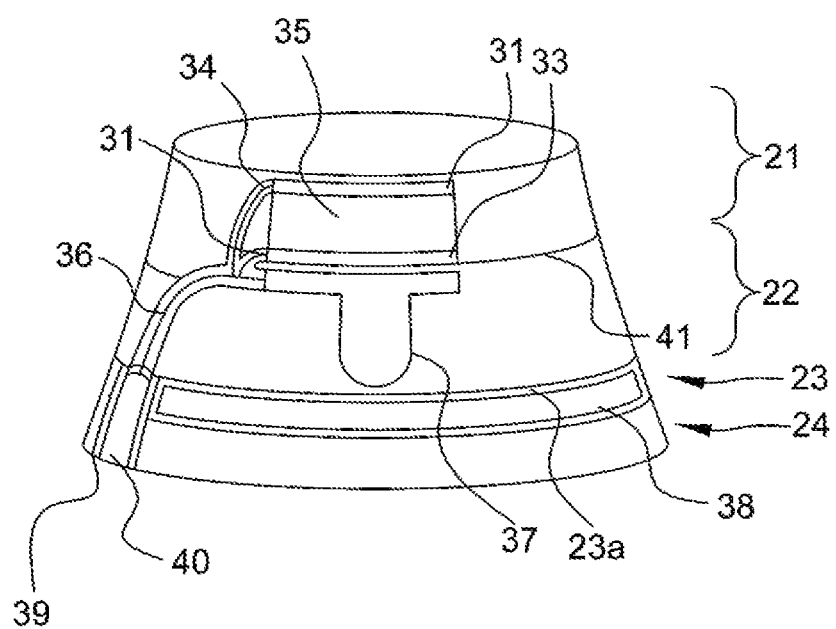
FIG. 2 is a transparent side view of the bottom of the glassware of FIG. 1 showing each component and chambers and how they are relative to each other.

Referring to FIG. 1, there is disclosed a side view of a light up glass 10 in accordance with a preferred embodiment of the present invention. The light up glass 10 comprises mainly of two parts: glass body 1 and glass bottom 2. FIG. 2 shows that the glass base 2 further comprises 3 chambers from top to bottom: power source chamber 21, light source chamber 22, and logo film chamber 23. A power source chamber 21 has a recess with a positive 32 and negative terminal 33 for receiving the power source 31. A positive wire lead 34 connects the positive terminal 32 to the light source 37 through a wire channel 36. A negative wire lead 35 connects the negative terminal 32 to the light source 37 through the wire channel 36. The positive wire lead 34 and the negative wire lead 35 also connect to a pressure on/off switch 40. The light source 37 sits in a recess inside the light source chamber 22.

All the chambers including the power source 21, light source 22 and logo film 23 chambers are sealed and water proof. In another embodiment, the power source chamber 21, light source chamber 22, and may be arranged on the same layer. In another embodiment, the power source chamber 21 and light source chamber 22 may be combined as one single chamber, thus the power source 31 and light source 37 are in proximity. The chamber is sealed and water proof. Thus, there is no need of a wire channel 36 to protect the wire lead 34, 35 that connect the power source 31 and light source 37.

A logo film chamber 23 is below the light source chamber 22. The logo film 38 can be placed in the logo film chamber 23. Different logo films 38 may be used and switched out from the logo film chamber 23. A lid 24 is placed below the logo film chamber 23 to cover the logo film 38. The lid 24 is actually the bottom surface of the light up glass 10 that touches the table surface.

When the pressure on/off switch 40 is pressed in due to the weight of the light up glass 10 that is placed on a table surface, the circuitry between the light source 37 and the power source 31 are opened/disconnected so that the light source 37 will not be receiving power and will be off. When the light up glass 10 is lifted up, the pressure on/off switch 40 is not pressed in, the circuitry between the light source 37 and the power source 31 are closed/connected so the light source 37 will be powered on.

The glass base 2 should be sealed and water resistant so the inside electrical components are not exposed and damaged by the surrounding liquids.

In another embodiment, there may be a button channel 39 that passes through the logo film chamber 23, lid 24 allowing the pressure on/off button 40 to pass through these chambers.

The glass body 1 and the housing of the glass bottom 2 may be made of acrylic or any other material suitable or known in the art for making drink containers. The drink container may be shaped as pilsner, glass, shot, shooter or other different shapes and have different volumes. The light up glass 10 may be made from molds of different shapes and volumes.

Any light source 37 suited for the intended purpose will suffice, such as, but not limited to light-emitting diodes (LED's), fiber optics, halogen, incandescent, laser, fluorescent, magnetic, and the like.

The partition 23a between the light chamber 22 and logo film chamber 23 and the lid 24 are constructed from transparent materials for allowing the light to transmit through. When the glassware 10 is picked up, the pressure sensitive button 40 is turned on, the light transmits through the partition 23a into the logo film chamber 23 and partially and selectively transmits through the logo film 38 and develops the light pattern of the logo. This light pattern continuously transmits through the transparent lid 24 and projects onto the solid surface including a dining table surface, a bar table surface or a surrounding wall.

Figure 3:
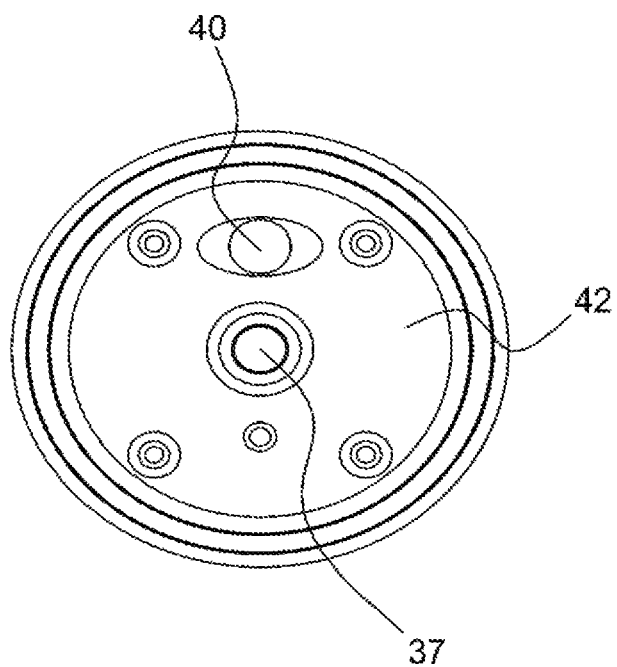
FIG. 3. is a bottom view of the light up glass in accordance with an embodiment of the present invention without a lid and logo film chamber present.

Referring to FIG. 3, there is disclosed a bottom view of a light up glass 10 according to a preferred embodiment of the present invention with removal of the lid 24 and logo film chamber 23. It is observed that a light 37 (e.g. LED) is located in the center of the glass bottom 2. In this embodiment, the pressure sensitive switch 40 is located inside the light source chamber 22 near the perimeter. The roof 41 of the light source chamber 22 may be made of a non-transparent material so that the light won't be diffused and transmit to the unwanted direction. Alternatively, the light chamber 22 of transparent material may contain a piece of non-transparent material 42 to cover the roof, thus blocking the light transmit towards the unwanted direction.

Figure 4:
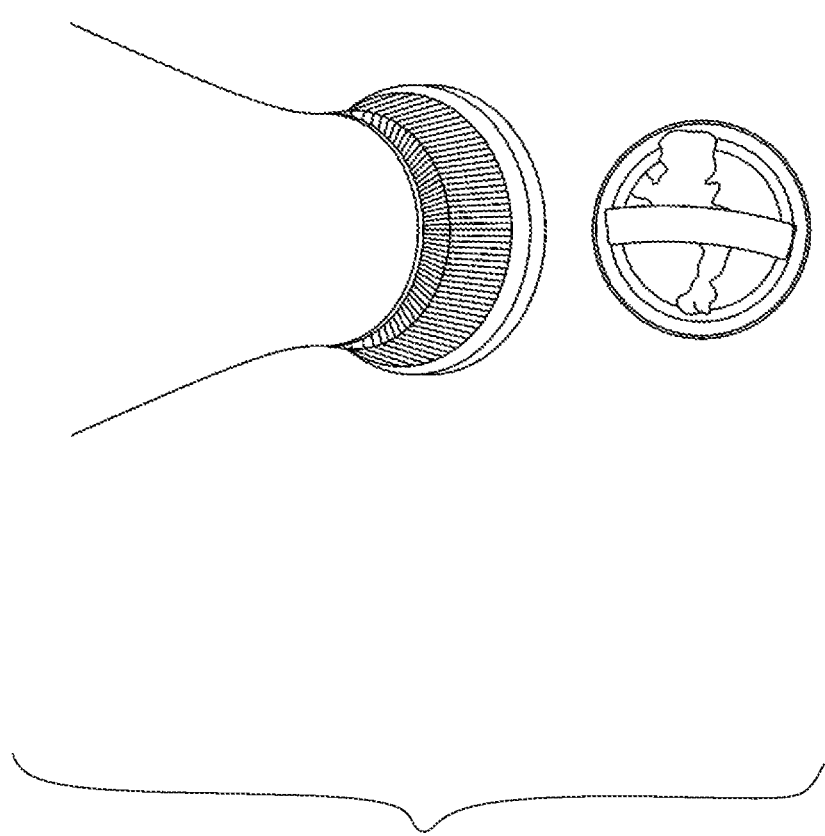
FIG. 4 is a perspective view of the light up glass which projects a company's logo onto a solid surface below the acrylic glass when the item is lifted.
Figure 5:
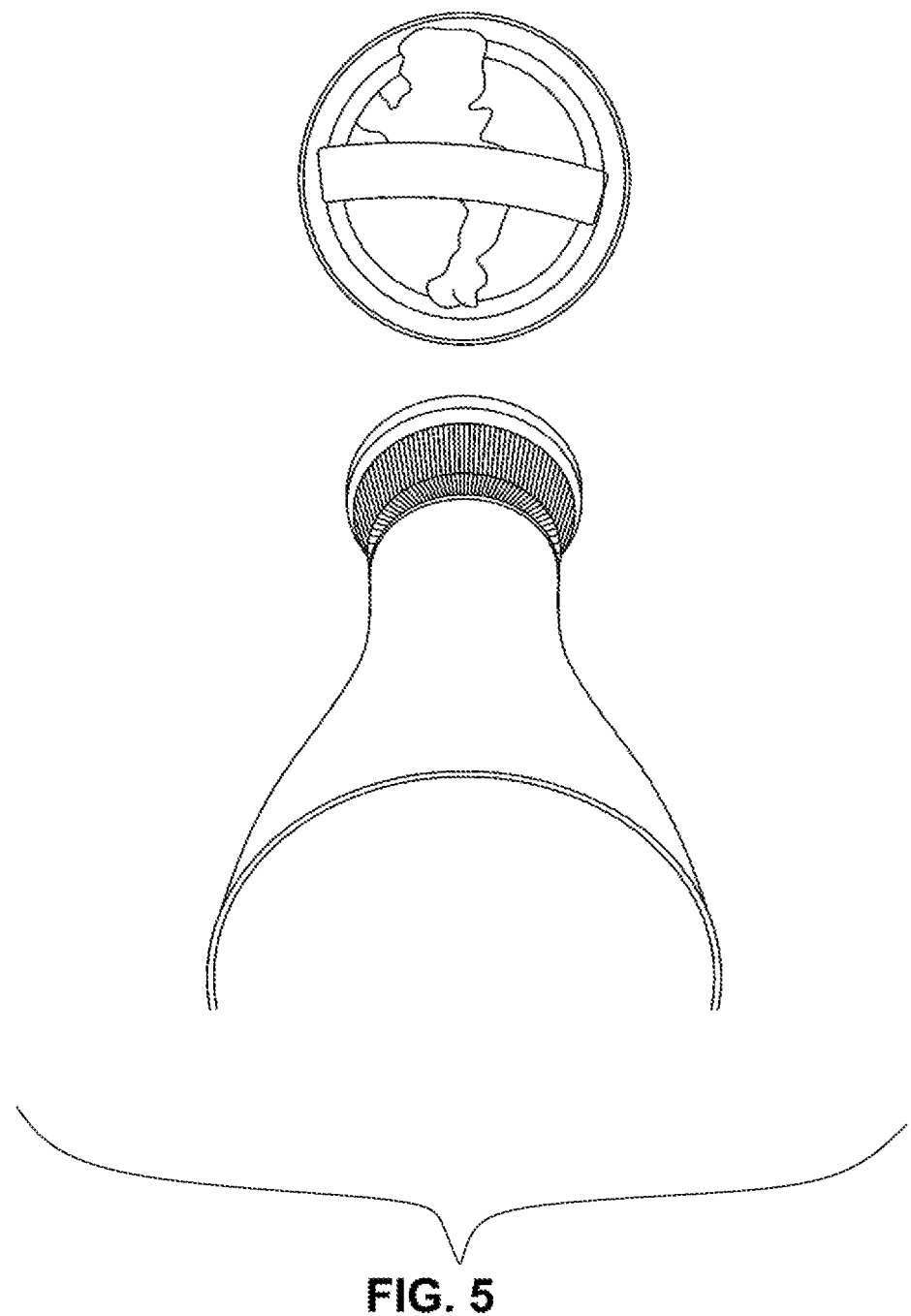
FIG. 5 is another perspective view of the light up glass which projects a company's logo onto a solid surface below the acrylic glass when the item is lifted.
Figure 6:
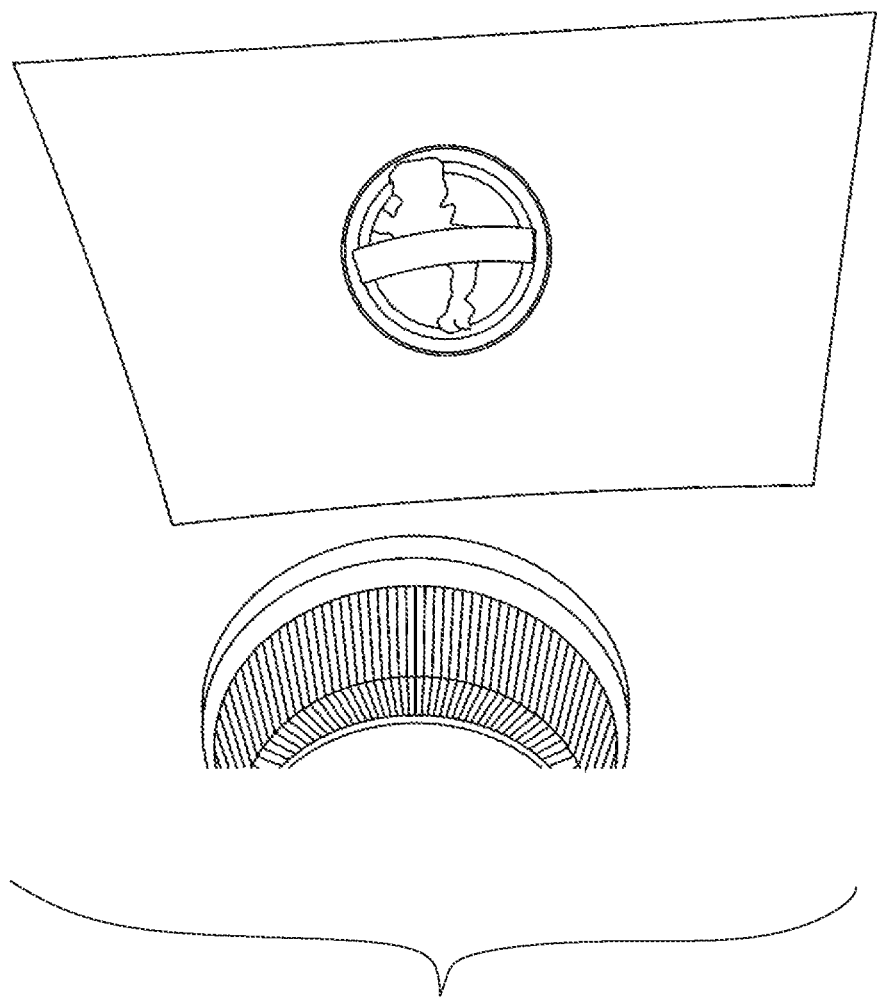
FIG. 6 is another perspective view of the light up glass which projects a company's logo onto a solid surface below the acrylic glass when the item is lifted.

The logo films 38 may contain company's logos or advertisement images or personal messages such as greetings or congratulations. Then the light shines through the logo film, the light up glass 10 project a company's logo onto a solid surface below the acrylic glass when the glass is lifted. Referring to FIGS. 4-6, there are disclosed perspective views of the light up glass which projects a company's logo onto a solid surface below the acrylic glass when the item is lifted.

In another embodiment, the light up glass 10 may be made of one single unit mold with the logo already built into the bottom of the glass. In another embodiment, the light up glass 10 may contain a removable lid 24 so that the logo film 38 may be switched to provide advertisement for different merchants.

The power source 31 may be batteries, such as rechargeable battery or solar powered rechargeable battery. The components such as power source 31 and Light source 37 may be already built in the light up glass 10 and cannot be replaced. In another embodiment, these components may be replaced.

In another embodiment, the light up glass 10 may project the logo image up into the liquid inside the glass instead of showing the logo on a flat surface below. In this embodiment, the logo film 38 is installed above the light source 37 instead of below the light source 37.

While there have been shown and described and pointed out the fundamental novel features of the invention as applied to the preferred embodiments, it will be understood that the foregoing is considered as illustrative only of the principles of the invention and not intended to be exhaustive or to limit the invention to the precise forms disclosed. Obvious modifications or variations are possible in light of the above teachings. The embodiments discussed were chosen and described to provide the best illustration of the principles of the invention and its practical application to enable one of ordinary skill in the art to utilize the invention in various embodiments and with various modifications as are suited to the particular use contemplated All such modifications and variations are within the scope of the invention as determined by the appended claims when interpreted in accordance with the breadth to which they are entitled.

What is claimed is:

1. A light up glass comprising:
a glass body for receiving drink; and
a glass base for projecting images, the glass base comprising:
   a plurality of wires;
   at least one light source;
at least one power source connected to said light source via a plurality of wires;

one power-switching means connected with the light source and the power source via the plurality of wires to turn on and off of the light source;
one logo film;
at least one chamber for housing the light source, power source, logo film, pressure sensitive switch, and wire; and
a lid located on the bottom of the light up glass for closing the housing;
wherein the light source is activated by the power-switching means to project a logo image when the light up glass is picked up and is deactivated by the switch when the light up glass is put on the table.

2. The light up glass of claim 1, wherein said lid is transparent so that light generated from the light source can transmit through and project onto a solid surface below the acrylic glass when the light up glass is lifted.

3. The light up glass of claim 1 wherein the power-switching means comprises a pressure sensitive switch which controls the light source from an open light-on mode to a closed light-off mode.

4. The light up glass of claim 1 wherein the light up glass are made from acrylic glass.

5. The light up glass of claim 1 wherein the logo film is below the light source so that the logo image is projected onto a solid surface below the glass when the light up glass is lifted.

6. The light up glass of claim 1 wherein the logo film is above the light source so that the logo image is projected up into the liquid inside when the light up glass is lifted.

7. The light up glass of claim 1 wherein the housing is completely sealed and water resistant so that the power source, light source, wires are not damaged by liquids.

8. The light up glass of claim 1 wherein the logo film may contain logo or advertisement or greeting messages.

9. The light up glass of claim 1 wherein the housing may comprise partition between light source and logo film, the partition is transparent.

10. An light up glass comprising:
a glass body for receiving drinks; and
a glass base for projecting images, the glass base comprising:
at least one light source;
at least one power source switchably connected to said light source;
a sealed unit having a light-source chamber to contain said light source, a power-source chamber above said light-source chamber, and two wire lead channels on the sealed unit upper side and in communication with said light-source chamber;
a lid under said sealed unit, said lid having a lid chamber mating with said light-source chamber to thereby contain said light-source chamber therein and further having a power-switching means for powering said at least one light source into and from an off-light mode into and from an on-light mode;
a housing covering said sealed unit and said lid such that a cavity is defined therein and a water-tight integrity is maintained within said housing; and
a drinking glassware containing said housing on the bottom portion of said drinking glassware.

11. The light up glass of claim 10 wherein said lid chamber has a transparent bottom.

12. The light up glass of claim 10 wherein said power-switching means comprises said power-source chamber being adapted to permit said power source to reciprocally translate therein from an open light-on mode to a closed light-off mode.

13. The light up glass of claim 10 wherein said power-switching means contains a button extending beyond out of a hole on said lid, upon application of pressure thereon said button from the weight of the glass, said button activates said light source into and from an on-light mode into an off-light mode.

* * * * *